United States Patent
Yamada

(10) Patent No.: US 10,689,829 B2
(45) Date of Patent: Jun. 23, 2020

(54) INPUT CONTROL METHOD OF TOUCH PANEL MONITOR FOR WORKING MACHINE

(71) Applicant: Caterpillar SARL, Geneva (CH)

(72) Inventor: Hideo Yamada, Tokyo (JP)

(73) Assignee: Caterpillar SARL, Geneva (CH)

( * ) Notice: Subject to any disclaimer, the term of this patent is extended or adjusted under 35 U.S.C. 154(b) by 363 days.

(21) Appl. No.: 15/128,371

(22) PCT Filed: Apr. 15, 2015

(86) PCT No.: PCT/EP2015/058144
§ 371 (c)(1),
(2) Date: Sep. 22, 2016

(87) PCT Pub. No.: WO2015/158761
PCT Pub. Date: Oct. 22, 2015

(65) Prior Publication Data
US 2017/0107693 A1    Apr. 20, 2017

(30) Foreign Application Priority Data

Apr. 16, 2014    (JP) .................. 2014-084681

(51) Int. Cl.
*E02F 9/16* (2006.01)
*E02F 9/26* (2006.01)
(Continued)

(52) U.S. Cl.
CPC ............ *E02F 9/2004* (2013.01); *B60K 31/00* (2013.01); *B60K 35/00* (2013.01); *B60K 37/06* (2013.01);
(Continued)

(58) Field of Classification Search
CPC . E02F 9/2004; E02F 9/26; E02F 9/264; E02F 9/265; E02F 9/267; E02F 9/268;
(Continued)

(56) References Cited

U.S. PATENT DOCUMENTS 5,632,190 A    5/1997  Sunamura et al.
8,514,055 B2   8/2013  Ishikawa
(Continued)

FOREIGN PATENT DOCUMENTS

CN    101965281       2/2011
EP      0744502 B1    2/2006
(Continued)

OTHER PUBLICATIONS

European Patent Office, International Search Report in International Patent Application No. PCT/EP2015/058144, dated Jun. 15, 2015, 3 pp.

*Primary Examiner* — Nitin Patel
*Assistant Examiner* — Amen Woldesenbet Bogale

(57) ABSTRACT

Method for controlling input to a touch panel includes a monitor screen display displaying a rear camera image screen, a measurement screen at the touch panel, and an input operation screen display in which an input operation can be performed. When the machine is operable, a monitor screen can be displayed in an input lock state in which the input operation is inhibited by turning off a hydraulic lock switch and releasing a hydraulic lock state. A specific input lock releasing operation on the touch panel releases the lock and the monitor screen display is switched to the input operation screen display.

3 Claims, 4 Drawing Sheets

(51) Int. Cl.
*F15B 15/26* (2006.01)
*F15B 21/08* (2006.01)
*E02F 3/32* (2006.01)
*E02F 9/20* (2006.01)
*E02F 9/22* (2006.01)
*B60K 31/00* (2006.01)
*B60K 37/06* (2006.01)
*B60K 35/00* (2006.01)

(52) U.S. Cl.
CPC ............... *E02F 9/16* (2013.01); *E02F 9/226* (2013.01); *E02F 9/2292* (2013.01); *E02F 9/2296* (2013.01); *E02F 9/26* (2013.01); *F15B 15/26* (2013.01); *F15B 21/08* (2013.01); *B60K 2370/145* (2019.05); *B60K 2370/1438* (2019.05); *B60K 2370/61* (2019.05); *E02F 3/32* (2013.01); *F15B 2211/6303* (2013.01)

(58) Field of Classification Search
CPC . E02F 9/16; E02F 9/262; B60K 35/00; B60K 2350/1028; B60K 2350/10; B60K 2350/1004; B60K 2350/1008; B60K 2350/1012; B60K 2350/1016; B60K 2350/1024; B60K 2350/104; G05B 2219/23037
See application file for complete search history.

(56) References Cited

U.S. PATENT DOCUMENTS

| | | | |
|---|---|---|---|
| 2008/0165145 A1 | 7/2008 | Herz et al. | |
| 2010/0288567 A1* | 11/2010 | Bonne | B60K 37/06 178/18.01 |
| 2012/0245760 A1 | 9/2012 | Ikeya | |
| 2012/0313770 A1* | 12/2012 | Zeiger | B60K 35/00 340/441 |
| 2013/0198506 A1* | 8/2013 | Smith | G06F 1/1684 713/100 |
| 2013/0222305 A1* | 8/2013 | Kanno | G06F 3/0484 345/173 |
| 2016/0280234 A1* | 9/2016 | Reilhac | B60K 35/00 |

FOREIGN PATENT DOCUMENTS

| | | | |
|---|---|---|---|
| EP | 2196363 A1 | 6/2010 | |
| EP | 2386387 A1 * | 11/2011 | ......... G06F 3/04883 |
| EP | 2386387 A1 | 11/2011 | |
| JP | 2002-173956 A | 6/2002 | |
| JP | 2002-322687 A | 11/2002 | |
| JP | 2005-188156 A | 7/2005 | |
| JP | 2005-234291 A | 9/2005 | |
| JP | 2005-307483 A | 11/2005 | |
| JP | 2008-202331 A | 9/2008 | |
| JP | 2009-023581 A | 2/2009 | |

* cited by examiner

INPUT CONTROL METHOD OF TOUCH PANEL MONITOR FOR WORKING MACHINE

CROSS-REFERENCE TO RELATED APPLICATIONS

This application is a national phase application of International Patent Application N. PCT/EP2015/058144, filed Apr. 15, 2015, which claims priority to Japanese Patent Application No. JP 2014-084681, filed Apr. 16, 2014, both of which are incorporated by reference herein in their entireties for all purposes.

TECHNICAL FIELD

The present invention relates to an input control method of a touch panel monitor for a working machine having an input function.

BACKGROUND ART

A monitor capable of assisting in operating a working machine such as an excavator and allowing an operator to perform maintenance of the working machine is mounted beside of a driver's seat of the working machine, and in many cases, the monitor is disposed in a deep front side of a cab (the right front side seen from the operator) (for example, see Patent Literatures 1 and 2).

In such a monitor, a rear-view camera image obtained with a rear-view monitor camera of a working machine may be displayed (for example, see Patent Literature 3).

Such a monitor has physical select switches of a working machine. In order to prevent an operator of the monitor from operating a display switch by mistake during execution of tasks so that information that is not related to the tasks is displayed to make the operator bewildered, some monitors allow a specific display screen to be selectable only in an idling state so that the screen is not displayed even when the select switch is pressed in a task execution state (for example, see Patent Literature 2).

Moreover, a working machine monitor which employs a touch panel monitor which uses a touch panel as an input device is known (for example, see Patent Literature 4).

Patent Literature 1: Japanese Patent Application Publication No. 2005-188156

Patent Literature 2: Japanese Patent Application Publication No. 2005-307483

Patent Literature 3: Japanese Patent Application Publication No. 2008-202331

Patent Literature 4: Japanese Patent Application Publication No. 2002-173956

DISCLOSURE OF THE INVENTION

A touch panel monitor as an input device reacts with a very small operation force unlike a normal switch and uses the entire screen as an input device. Thus, when an operator of a working machine touches on a touch panel unintentionally, an unexpected operation (that is, an operation that is not intended by an operator) may occur. Due to this, troubles such as an operation that is not intended by an operator or a change in display are likely to occur as compared to a monitor having a select switch.

For example, when a working machine travels on a slope, the operator may put the hands on various positions inside a cab to support the body while operating a lever. Thus, the possibility of the operator touching on the touch panel unintentionally is high as compared to an automobile or the like, for example. In this case, the touch panel may mistake the touch for a monitor input operation and the possibility of the occurrence of an operation that is not intended by the operator increases.

Moreover, a working machine is configured such that hydraulic equipment can be calibrated by operating a setting screen on a monitor. When a touch panel monitor is employed and such a setting screen is displayed and operated unintentionally, the working machine may perform an operation that is not intended by the operator.

Thus, when a touch panel monitor is employed, a safer touch panel monitor input method which can clear such a problem is required.

On the other hand, in a touch panel display used in a portable terminal such as a smartphone, various methods for saving battery life or preventing an unintended operation while carrying the terminal are used. According to such methods, the screen display is turned off and an operation is locked unless there is a user operation for a predetermined period. When a user wants to input an operation, a screen for urging the input of a specific monitor input unlock operation is displayed to release the lock state, and then, an operation screen is displayed.

However, in a working machine, during excavation which does not require an operation on the touch panel monitor, it is necessary to display the image obtained by a rear-view monitor camera in order to check the safety on the rear side of the working machine, for example. Due to this, an input control method capable of disabling a monitor input operation on a touch panel, which is not intended by the operator of the working machine while enabling monitor screen display is required.

With the foregoing in view, an object of the present invention is to provide an input control method of a touch panel monitor for a working machine capable of preventing an unintended operation input on a touch panel while enabling monitor screen display.

An invention according to claim 1 is an input control method of a touch panel monitor for a working machine capable of switching, on a touch panel mounted on a working machine, between a monitor screen display and an input operation screen display where a monitor input operation is enabled, wherein when the working machine is operable, control is performed such that a monitor input lock state where the monitor input operation is disabled while enabling the monitor screen display is created, and control is performed such that the monitor input lock state is released by a specific monitor input unlock operation on the touch panel so that the display is switched to the input operation screen display.

An invention according to claim 2 is the input control method of a touch panel monitor for a working machine according to claim 1, in which the working machine includes: a hydraulic actuator that actuates respective units of the machine; and a hydraulic lock switch that switches between a hydraulic lock state where a manual operation of a hydraulic circuit that operates the hydraulic actuator is disabled, and a hydraulic unlock state where the manual operation of the hydraulic circuit is enabled, and control is performed such that the touch panel enters into the monitor input lock state when the hydraulic lock state is switched to the hydraulic unlock state by the hydraulic lock switch.

An invention according to claim 3 is the input control method of a touch panel monitor for a working machine according to claim 1 or 2, in which control is performed such that the touch panel automatically enters into the monitor input lock state when there is no monitor input operation on the touch panel for a predetermined period even in a state where the monitor input operation is enabled after the monitor input lock state is released.

An invention according to claim 4 is the input control method of a touch panel monitor for a working machine according to any one of claims 1 to 3, wherein when an operation screen that influences the operation of the working machine is displayed on the touch panel, control is performed such that a setting change screen is displayed by simultaneously touching a plurality of positions on the touch panel.

According to the invention of claim 1, in the touch panel monitor mounted on the working machine, when the working machine is operable, the monitor input lock state where necessary information is obtained from the monitor screen display and the monitor input operation on the touch panel is disabled is created. When the monitor input lock state is released, a specific monitor input unlock operation on the touch panel is required. Thus, even when the operator during operating the working machine performs an unintended operation to touch on the touch panel, it is possible to prevent the input of an unintended operation on the touch panel.

According to the invention of claim 2, control is performed such that the touch panel enters into the monitor input lock state when the hydraulic lock state is switched to the hydraulic unlock state by the hydraulic lock switch. Thus, when the working machine enters into an operable state in accordance with the switching from the hydraulic lock state to the hydraulic unlock state, the monitor input operation from the touch panel is automatically disabled. Therefore, it is possible to reliably prevent the input of an unintended operation on the monitor simultaneously with the working machine entering into the operable state.

According to the invention of claim 3, control is performed such that the touch panel automatically enters into the monitor input lock state when there is no monitor input operation on the touch panel for a predetermined period even in a state where the monitor input operation is enabled. Thus, it is possible to prevent an unintended input operation of the operator by urging the operator to perform a monitor input unlock operation and a monitor input operation on the touch panel.

According to the invention of claim 4, when an operation screen that influences the operation of the working machine is displayed on the touch panel, control is performed such that a setting change screen is displayed by simultaneously touching a plurality of positions on the touch panel, which is difficult to perform unintentionally. Thus, it is possible to reduce the possibility of the operator performing an unintended monitor input operation.

BEST MODE FOR CARRYING OUT THE INVENTION

Hereinafter, the present invention will be described in detail based on an embodiment illustrated in FIGS. 1 to 5.

Figure 4:
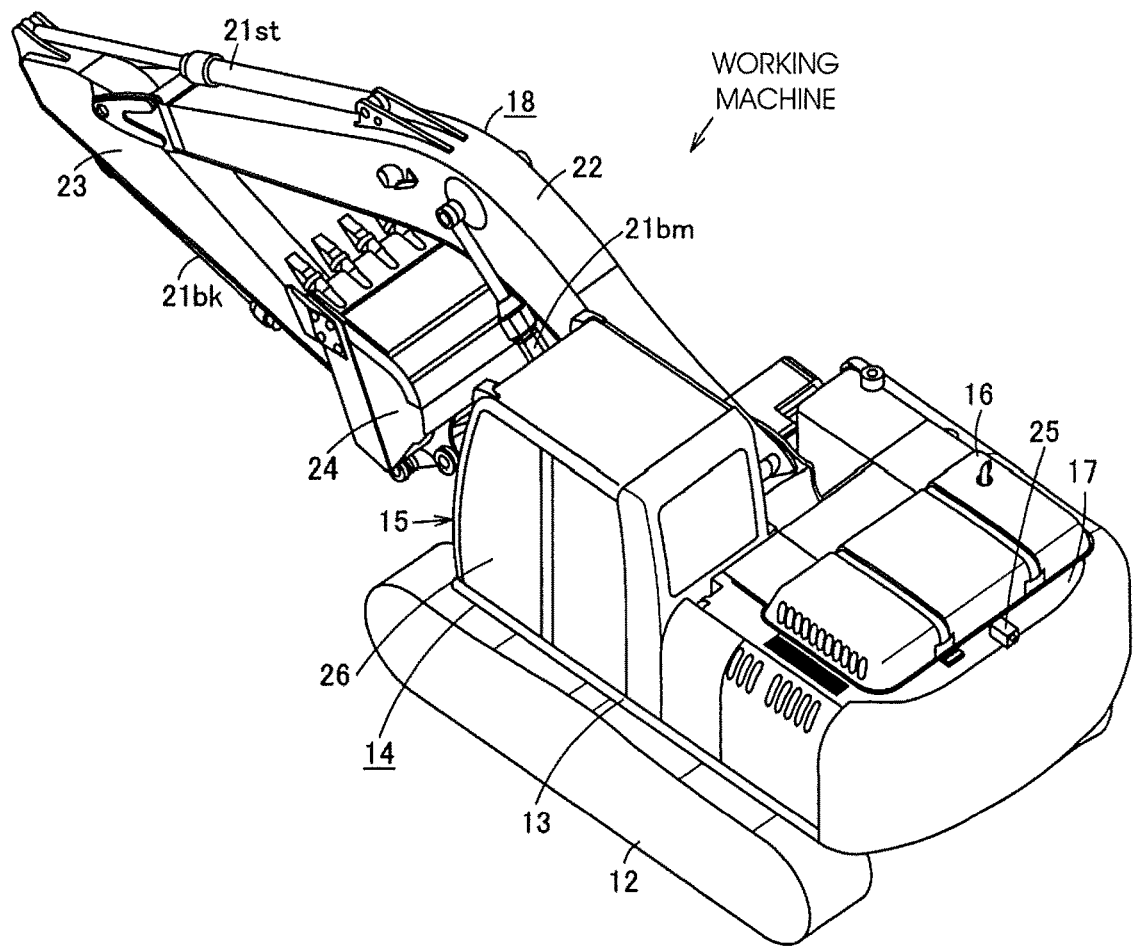
FIG. 4 is a perspective view illustrating a working machine having the monitor mounted thereon.

FIG. 4 illustrates a working machine (excavator) 11, and the working machine 11 includes a body 14 which includes a lower traveling body 12 and an upper swinging body 13 that is swingably provided on the lower traveling body 12.

A working unit 18 that operates with operating hydraulic pressure is provided on the upper swinging body 13 together with a cab 15, a power unit 16, a counterweight 17, and the like. The working unit 18 includes a boom 22, a stick 23, a bucket 24, and the like which are pivoted by hydraulic actuators such as a boom cylinder $21bm$, a stick cylinder $21st$, a bucket cylinder $21bk$, and the like. A rear-view monitor camera 25 that captures a rear-view image of the base 14 is provided in a central portion of the upper surface of the counterweight 17.

A hatch 26 through which an operator enters and exits the cab 15 is provided on the left side surface of the cab 15.

Figure 5:
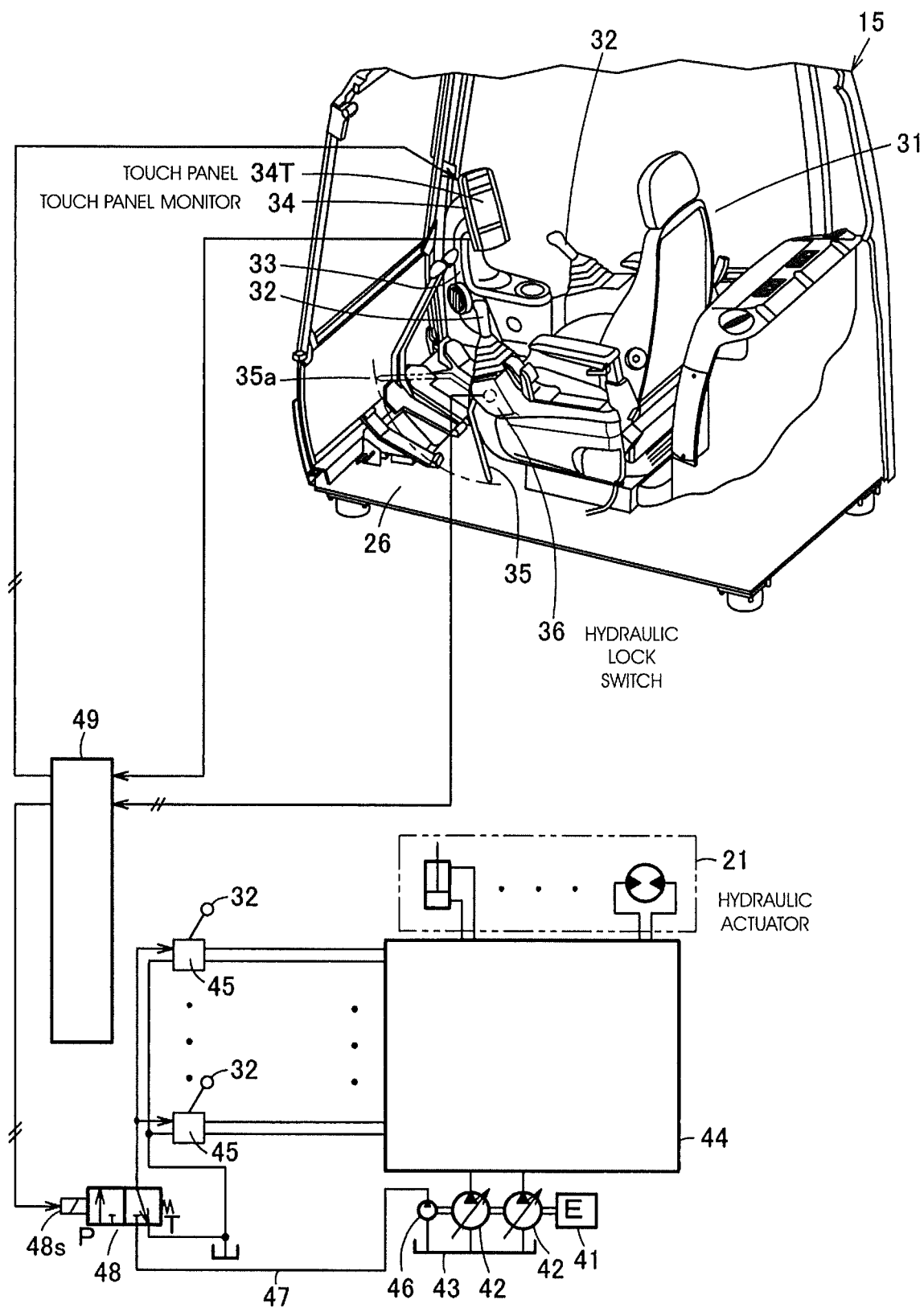
FIG. 5 is a perspective view illustrating the inside of a cab of the working machine and is a circuit diagram illustrating a relation between a hydraulic lock switch and a hydraulic lock valve.

As illustrated in FIG. 5, a driver's seat 31 on which the operator sits is provided inside the cab 15, operating levers 32 are provided on both left and right sides and the front side of the driver's seat 31, an air-conditioning outlet 33 is disposed on the front right side of the driver's seat 31, and a touch panel monitor 34 having an input function is provided above the air-conditioning outlet 33.

A hydraulic lock lever 35 that opens and closes the hatch 26 of the cab 15 is openably and closably provided on the lower side of the operating lever 32 positioned closer to the hatch 26 of the cab 15. The hydraulic lock lever 35 is a hydraulic lock lever for creating a hydraulic lock state so that a hydraulic circuit does not work even when the operating lever 32 is operated in a case where the hydraulic lock lever 35 is at a hatch opening position (a solid-line position in FIG. 5) to allow the operator to get on or off the upper swinging body 13.

A hydraulic lock switch 36 is provided at the attachment portion of the hydraulic lock lever 35 to allow the operator to understand whether the hydraulic lock lever 35 is at a hatch closing position (a two-dot-chain-line position in FIG. 5) or at a hatch opening position (a solid-line position in FIG. 5). The hydraulic lock switch 36 is a detector for switching between a hydraulic lock state of disabling a lever operation of the hydraulic circuit that operates the hydraulic actuators 21 such as a travel motor (not illustrated), a swing motor (not illustrated), the boom cylinder $21bm$, the stick cylinder $21st$ and the bucket cylinder $21bk$, and a hydraulic unlock state of enabling the lever operation of the hydraulic circuit.

In the hydraulic circuit illustrated in FIG. 5, a main pump 42 driven by an engine 41 that is mounted on the upper swinging body 13 pressurizes an operating oil in a tank 43 and supplies the pressurized operating oil to a control valve 44. The control valve 44 controls the direction and the flow rate of the operating oil supplied to the hydraulic actuators 21 to control the direction and the speed of the operations of the hydraulic actuators 21.

The control valve 44 includes a number of movable valves (spools) corresponding to the number of hydraulic actuators 21, and each movable valve is proportionally displaced from a neutral position in accordance with a pilot pressure supplied from a pilot valve 45 which is manually operated by the corresponding operating lever 32.

Each pilot valve 45 reduces an initial pilot pressure (or primary pilot pressure) supplied from a pilot pump 46 that is driven together with the main pump 42 by the engine 41 to a pilot pressure (or secondary pilot pressure) that is approximately proportional to an operation amount of the operating lever 32 so that respective movable valves of the control valve 44 are operated by the pilot pressure.

An electromagnetic hydraulic lock valve 48 is provided in the midway of an initial pilot pressure passage 47 that supplies initial pilot pressure to these pilot valves 45. The hydraulic lock valve 48 is displaced when a solenoid receives an electrical signal (current) from the outside whereby the hydraulic lock valve 48 switches from a lock position T where the initial pilot pressure passage 47 is blocked, to a communication position P where the initial pilot pressure passage 47 communicates with the respective pilot valves 45.

The touch panel monitor 34 has a monitor controller (not illustrated) incorporated in a monitor body. The monitor controller is connected to the input and output sides of a machine controller 49. The hydraulic lock switch 36 is connected to the input side of the machine controller 49. A solenoid 48s of the hydraulic lock valve 48 is connected to the output side of the machine controller 49. The machine controller 49 controls the relation between the monitor controller, the hydraulic lock switch 36, and the hydraulic lock valve 48.

When the hydraulic lock lever 35 is at a hatch closing position 35a indicated by the two-dot chain line in FIG. 5, the hydraulic lock switch 36 is off and the machine controller 49 supplies current to the solenoid 48s of the hydraulic lock valve 48 to put the hydraulic lock valve 48 to the communication position P to unlock the hydraulic lock state. As a result, a state where the working machine 11 can operate by the operation of the operating lever 32 is created.

On the other hand, when the hydraulic lock lever 35 is at a hatch opening position indicated by the solid line in FIG. 5, the hydraulic lock switch 36 is on, and the supply of current to the hydraulic lock valve 48 is stopped and the hydraulic lock valve 48 is returned to the lock position T to block the communication of the initial pilot pressure passage 47 with the respective pilot valves 45, whereby a hydraulic lock state is created. As a result, a state where the working machine 11 cannot be operated even when the operating lever 32 is moved is created.

In this manner, in the hydraulic lock state where the hydraulic lock lever 35 is at the hatch opening position, initial pilot pressure is not supplied to the respective pilot valves 45. Thus, even when the operator operates the operating lever 32, it is not possible to displace the movable valves of the control valve 44. Accordingly, it is not possible to operate the hydraulic actuators 21 of the working machine 11. In order to enable the operation of the working machine 11, it is necessary to pivot the hydraulic lock lever 35 up to the hatch closing position 35a indicated by the two-dot chain line.

Figure 1:
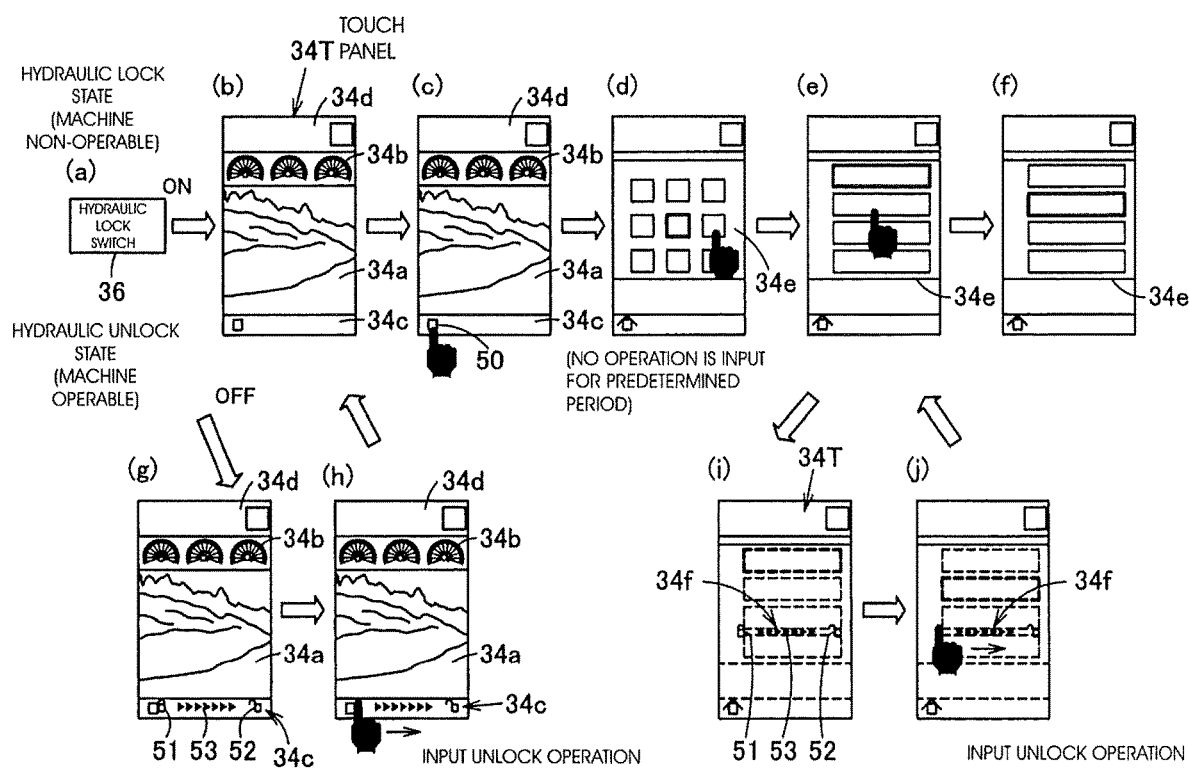
FIGS. 1A to 1J are diagrams illustrating a series of touch panel screens, illustrating an embodiment of an input control method of a touch panel monitor for a working machine according to the present invention.
Figure 2:
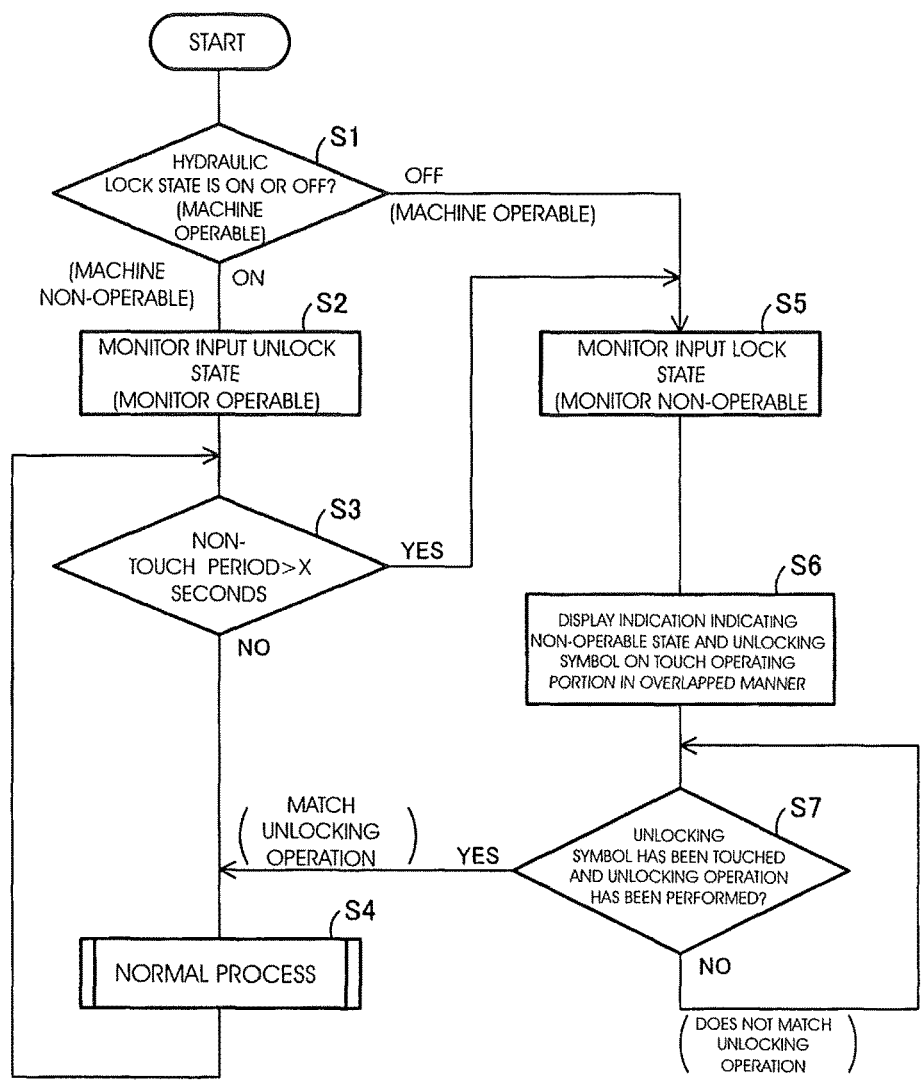
FIG. 2 is a flowchart illustrating a control procedure of the input control method.
Figure 3:
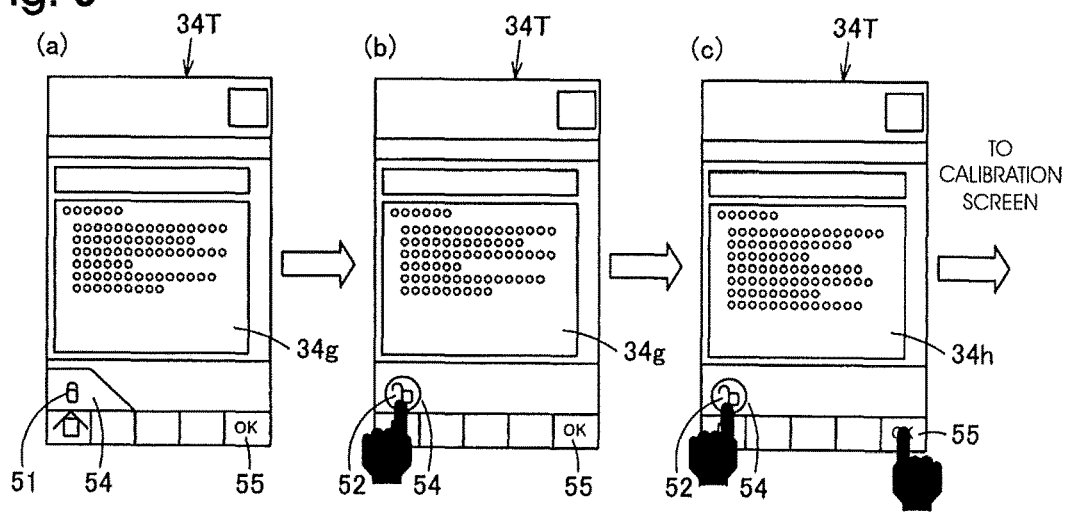
FIGS. 3A to 3C are diagrams illustrating a series of touch panel screens, illustrating an operation screen display example of an operation menu of the input control method.

Next, a control example of the monitor controller and the machine controller 49 incorporated in the touch panel monitor 34 of the working machine 11 will be described with reference to the monitor screens illustrated in FIGS. 1A to 1J and the flowchart illustrated in FIG. 2.

(Step S1)

The pivot operation of the hydraulic lock lever 35 of the working machine 11 (that is, the on/off operation of the hydraulic lock switch 36) is interlocked with a touch panel 34T of the touch panel monitor 34, and as illustrated in FIG. 1A, it is determined whether the hydraulic lock switch 36 is on or off.

(Step S2)

When the hydraulic lock switch 36 of the working machine 11 is on (that is, in a hydraulic lock state where the working machine 11 is not operable even when the operating lever 32 is moved), a monitor input unlock state where a monitor input operation on the touch panel 34T is enabled is created automatically.

In this case, the display on the touch panel 34T is such an initial screen display (default display) as illustrated in FIG. 1B. In this initial screen display, although it depends on the specifications and settings of the working machine 11, for example, if the working machine 11 is equipped with the rear-view monitor camera 25, a rear-view camera image screen 34a for displaying the rear-view image captured by the rear-view monitor camera 25 is displayed, and a meter screen 34b for displaying a fuel meter, an oil temperature meter, and the like is displayed above the screen 34a.

Moreover, an operation screen 34c is displayed under the rear-view camera image screen 34a, and a setting screen 34d indicating, in addition to time, the type of an attachment such as a bucket and a setting state such as an accelerator dial value is displayed at the top.

(Step S3)

A timer is provided in the touch panel monitor 34. In a Monitor input unlock state where a monitor input operation on the touch panel 34T is enabled, a non-touch period where a touch operation is not input is always measured, and it is determined whether the non-touch period exceeds "X" seconds set by the timer.

(Step S4)

A normal process is performed unless the nontouch period exceeds "X" seconds (step S3: NO). For example, as illustrated in FIG. 1C, when the operator touches on a screen switching switch 50 of the operation screen 34c, a menu select screen 34e illustrated in FIG. 1D is displayed. Moreover, for example, as illustrated in FIGS. 1E and 1F, the operator can perform various input operations on the touch panel monitor 34 by operating menu keys on the menu select screen 34e.

Examples of the menus that the operator can perform input operations on the touch panel 34T include a screen for display error codes, a screen for display sensor information (an operation state of the working machine 11), a screen for displaying equipment settings (the types of attachments and settings corresponding to the respective attachments), a screen for performing equipment adjustment (calibration), and a screen for checking various operations (for testing equipment).

(Step S5)

When the hydraulic lock switch 36 of the working machine 11 is off (that is, the hydraulic lock state is released so that the respective hydraulic actuators 21 of the working machine 11 can be operated when the operating lever 32 is moved), a monitor input lock state where the monitor input operation on the touch panel 34T is disabled while enabling the monitor screen display is created.

In the hydraulic unlock state where the hydraulic lock switch 36 is off, the initial screen display of the touch panel 34T does not change and the screen immediately before the lock such as the rear-view camera image is still displayed as illustrated in FIG. 1G. However, the monitor input operation on the screen such as a menu key operation on the touch panel 34T is disabled.

(Step S6)

In this monitor input lock state, an indication indicating inability to input operations is displayed, and a monitor input unlocking operation screen 34c is displayed under the rear-view camera image screen 34a as illustrated in FIG. 1G.

The monitor input unlocking operation screen 34c illustrated in FIG. 1G is a screen for urging the operator to input a monitor input unlocking gesture operation. For example, the monitor input unlocking operation screen 34c displays a lock icon (lock state icon) 51 indicating a monitor input lock state, an unlock icon (unlock state icon) 52 indicating a monitor input unlock state, and an arrow 53 for prompting the operator to move the finger from the lock icon 51 to the unlock icon 52 to perform a monitor input unlocking gesture operation. Moreover, in this case, the screen is still displayed, and the screen immediately before the monitor input lock such as the rear-view camera image screen 34a is displayed.

(Step S7)

As illustrated in FIG. 1H, it is determined whether a monitor input unlocking gesture operation (swipe or the like) of swiping from the lock icon 51 to the unlock icon 52 has been performed.

When the monitor input unlocking gesture operation is performed, the monitor input lock state is released and the initial screen display illustrated in FIG. 1B is displayed.

That is, when the monitor input unlock operation illustrated in FIG. 1H is detected, such a monitor input unlock icon as illustrated in FIG. 1H is removed from the operation screen 34c, and the screen switching switch 50 is displayed on the operation screen 34c as illustrated in FIGS. 1B and 1C, whereby a monitor input unlock state where a monitor input operation on the touch panel 34T is enabled is created. In this way, as illustrated in FIGS. 1C, 1D, 1E, and 1F, an input operation screen display where a menu key-based monitor input operation is enabled is created.

In this manner, when the hydraulic lock switch 36 is off (that is, a hydraulic unlock state is created), the monitor input operation on the touch panel 34T is automatically locked and it is not possible to perform a monitor input operation unless a special monitor input unlock operation is performed.

Moreover, even when the monitor input unlock state where the monitor input operation on the touch panel 34T is enabled is created in step S2, if it is determined in step S3 that the monitor input operation on the touch panel 34T has not been performed within the period X set by the timer (step S3: YES), a monitor input lock state where the monitor input operation on the touch panel 34T is disabled automatically is created as illustrated in FIG. 1I.

In the monitor input lock state, a monitor input unlocking operation screen 34f is displayed in an overlapping manner in a portion of the monitor screen similarly to the case illustrated in FIG. 1G. For example, the arrow 53 for prompting the operator to swipe the finger from the lock icon 51 for the monitor input lock state and the unlock icon 52 for the monitor input unlock state is displayed. When the operator performs the monitor input unlocking gesture operation as illustrated in FIG. 1J, the operator can perform a normal process.

The "determination of non-touch period" in step S3 within the above-described flow may apply to all screens (the initial screen, the menu screen, and the like) so that an unintended monitor input operation in all monitor screen displays is prevented.

As described above, in an input control method of the touch panel monitor 34 capable of switching, on the touch panel 34T mounted on the working machine 11, between a monitor screen display such as the rear-view camera image screen 34a or the meter screen 34b and an input operation screen display such as the menu select screen 34e where a monitor input operation is enabled, wherein when the working machine 11 is operable, a monitor input lock state where the monitor input operation on the touch panel 34T is disabled while enabling the monitor screen display is created, and the monitor input lock state is released by a specific monitor input unlock operation on the touch panel 34T so that the display is switched to the input operation screen display.

Due to this, in the touch panel monitor 34 mounted on the working machine 11, when the working machine 11 is operable, the monitor input lock state where necessary information is obtained from the monitor screen display such as the rear-view camera image screen 34a or the meter screen 34b and the monitor input operation on the touch panel 34T is disabled is created. When the monitor input lock state is released, a specific monitor input unlock operation on the touch panel 34T is required. Thus, even when the operator during operating the working machine 11 performs an unintended operation to touch on the touch panel 34T, the input operation on the touch panel 34T is locked during the operation, and the unlocking requires a specific gesture operation. Therefore, it is possible to prevent the input of an unintended operation on the monitor due to the unintended operation of the operator.

Further, the hydraulic lock switch 36 switches between a hydraulic lock state where a lever operation of the hydraulic circuit that operates the hydraulic actuator 21 of the working machine 11 is disabled and a hydraulic unlock state where the lever operation of the hydraulic circuit is enabled, and when the hydraulic lock state is switched to the hydraulic unlock state by the hydraulic lock switch 36, the touch panel 34T enters into the monitor input lock state. Thus, when the working machine 11 enters into an operable state in accordance with the switching from the hydraulic lock state to the hydraulic unlock state, the monitor input operation from the touch panel 34T is automatically disabled. Therefore, it is possible to reliably prevent the input of an unintended operation on the monitor simultaneously with the working machine 11 entering into the operable state.

Moreover, the touch panel 34T automatically enters into the monitor input lock state when there is no monitor input operation on the touch panel for a predetermined period even when the monitor input lock state is released and the monitor input operation is enabled. Thus, it is possible to prevent an unintended input operation of the operator by urging the operator to perform a monitor input unlock operation and a monitor input operation on the touch panel 34T.

Next, as illustrated in FIGS. 3A to 3C, when the touch panel 34T of the touch panel monitor 34 displays an operation screen indicating a specific operation menu which can influence the operation of the working machine 11, the monitor controller (not illustrated) and the machine controller 49 perform control so that a setting change screen is displayed by simultaneously touching a plurality of positions on the touch panel 34T.

For example, for screens such as a calibration screen for performing equipment calibration (calibration of hydraulic equipment or the like) or a test screen for checking various operations (for testing equipment), a monitor input lock state different from that of the screens 34a, 34b, and 34c illustrated in FIG. 1G is created like a setting start screen 34g illustrated in FIG. 3A. This is because, when an operator performs a monitor input operation such as an operation of changing settings on such screens using the touch panel 34T, the equipment of the working machine 11 may start working actually. For example, the front working units 22, 23, and 24 may move, the upper swinging body 13 may swing, the lower traveling body 12 may travel, a pump discharge pressure or the pressure of various hydraulic equipment may change, and the engine speed may change.

That is, when the operator wants to proceed to the next setting change screen 34h, the screen does not change if the operator touches on a next switch 54 only as illustrated in FIG. 3B, but the setting start screen 34g transitions to the setting change screen 34h when the operator touches on an OK switch 55 as well as the next switch 54 as illustrated in FIG. 3C.

In this case, in order to allow the operator to understand that a special operation is required for releasing the monitor input lock state, the lock icon 51 for the monitor input lock state, for example, may be displayed on the next switch 54 as illustrated in FIG. 3A. When the operator touches on the next switch 54, the lock icon 51 may be changed to the unlock icon 52 as illustrated in FIG. 3B. When the operator touches on the OK switch 55 while touching on the next switch 54 as illustrated in FIG. 3C, a calibration screen for the hydraulic equipment or the like may be displayed.

In this manner, for screens where the working machine 11 may move in response to an unintended operation input for calibration or the like, two-point touch of the OK switch 55 and the unlock icon 52 is required, and an operation which does not involve simultaneous touch of the two points is not regarded as a correct operation. Examples of such screens include a screen for performing equipment calibration where equipment may automatically start operating in order to calibrate the equipment of the working machine 11 when the OK switch 55 is pressed, and a screen for checking various operations (for testing equipment) where test output may be started when the OK switch 55 is pressed.

Conversely, the operation performed by one-point touch or swipe is limited to such a screen operation that the equipment is not likely to start operating even when it is performed, such as a screen scroll operation, an icon select operation (screen moving operation), or an operation of gradually increasing or decreasing values.

Although the OK switch 55 and the unlock icon 52 which is a monitor input unlocking symbol displayed so as to overlap with the next switch 54 which the operator wants to operate actually have been illustrated as a combination of switches for two-point touch, this combination is an example and can be changed depending on the screen. For example, a combination of the unlock icon 52 and a start button may be used. However, at least one of the combination is preferably the unlock icon 52 which is a monitor input unlocking symbol.

As described above, when the touch panel 34T displays such an operation screen that influences the operation of the working machine 11, it is preferable to perform a special monitor input unlocking gesture operation. The setting start screen 34g changes to the setting change screen 34h when the operator performs an operation that is difficult to perform unintentionally (for example, an operation of simultaneously touching two points on the touch panel 34T). Thus, it is possible to reduce the possibility of the operator performing an unintended monitor input operation.

INDUSTRIAL APPLICABILITY

The present invention is industrially applicable to business operators who perform an input control method of a touch panel monitor for a working machine.

EXPLANATION OF REFERENCE NUMERALS

11: Working machine
21: Hydraulic actuator
34: Touch panel monitor
34T: Touch panel
36: Hydraulic lock switch

The invention claimed is:

1. An input control method of a touch panel monitor for a working machine capable of switching, on a touch panel mounted on the working machine, between a monitor screen display and an input operation screen display where a monitor input operation is enabled, wherein
the working machine includes:
a working unit that operates with operating hydraulic pressure,
a hydraulic actuator that actuates respective units of the machine; and
a hydraulic lock switch that switches between a hydraulic lock state where a manual operation of a hydraulic circuit that operates the hydraulic actuator is disabled, and a hydraulic unlock state where the manual operation of the hydraulic circuit is enabled, and
when the working machine is operable, control is performed such that a monitor input lock state where the monitor input operation is disabled while enabling the monitor screen display is created,
control is performed such that the monitor input lock state is released to switch the input operation screen display from disabled to enabled by entering a specific monitor input unlock operation on the touch panel so that the display is switched to the input operation screen display, and
control is performed such that the touch panel enters into the monitor input lock state when the hydraulic lock state is switched to the hydraulic unlock state by the hydraulic lock switch.

2. The input control method of a touch panel monitor for a working machine according to claim 1, wherein
control is performed such that the touch panel automatically enters into the monitor input lock state when there is no monitor input operation on the touch panel for a predetermined period even in a state where the monitor input, operation is enabled after the monitor input lock state is released.

3. The input control method of a touch panel monitor for a working machine according to claim 1, wherein
when an operation screen that influences the operation of the working machine is displayed on the touch panel, control is performed such that a setting change screen is displayed by simultaneously touching a plurality of positions on the touch panel.

* * * * *